US008226250B2

(12) United States Patent
Uchida et al.

(10) Patent No.: US 8,226,250 B2
(45) Date of Patent: Jul. 24, 2012

(54) OPTICAL ELEMENT AND OPTICAL SYSTEM (75) Inventors: Kazue Uchida, Utsunomiya (JP);
Takeharu Okuno, Utsunomiya (JP);
Daisuke Sano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 12/548,754

(22) Filed: Aug. 27, 2009

(65) Prior Publication Data
US 2010/0053760 A1  Mar. 4, 2010

(30) Foreign Application Priority Data

Aug. 29, 2008  (JP) ................................. 2008-222899
Aug. 7, 2009   (JP) ................................. 2009-184144

(51) Int. Cl.
G02B 5/08 (2006.01)
(52) U.S. Cl. .................... 359/606; 359/582; 428/167
(58) Field of Classification Search .................. 359/580, 359/581, 586, 606, 582; 428/141, 156, 167
See application file for complete search history.

(56) References Cited

U.S. PATENT DOCUMENTS

| 4,013,465 A | 3/1977 | Clapham et al. | |
| 6,175,442 B1 * | 1/2001 | Booth et al. | 359/290 |
| 7,619,821 B2 * | 11/2009 | Yamada et al. | 359/581 |
| 2005/0233113 A1 | 10/2005 | Kotani et al. | |

FOREIGN PATENT DOCUMENTS

| JP | 50-70040 A | 6/1975 |
| JP | 9-202649 A | 5/1997 |
| JP | 3135944 A | 2/2001 |
| JP | 2004-333908 A | 11/2004 |
| JP | 2005-275372 A | 10/2005 |

* cited by examiner

*Primary Examiner* — Audrey Y Chang
(74) *Attorney, Agent, or Firm* — Canon USA, Inc., IP Division (57) ABSTRACT

The optical element includes a base member configured to have an optical surface, a concave-convex structure configured to have an average pitch smaller than a shortest wavelength of a use wavelength range, and an intermediate layer formed between the optical surface and the concave-convex structure, made of a material different from that of the concave-convex structure, and having a refractive index between those of the base member and the material of the concave-convex structure. The optical surface is formed into a shape having a rotational symmetry axis. A thickness of the intermediate layer or each of thicknesses of the intermediate layer and the concave-convex structure varies so as to increase as a distance from the rotational symmetry axis increases. The optical element has good anti-reflection performance not only at a central part of the optical surface having a small curvature radius but also at a peripheral part thereof.

8 Claims, 2 Drawing Sheets

OPTICAL ELEMENT AND OPTICAL SYSTEM

BACKGROUND OF THE INVENTION

The present invention relates to an optical element having a reflection suppressing function (anti-reflection function).

Optical elements such as lenses used in optical systems are manufactured by using a transparent base material such as optical glass or optical plastic. Such a transparent base material has a large refractive index, so that a reflectance thereof is high. A high reflectance of the transparent base material reduces an amount of effective light reaching an image surface, and generates unnecessary reflection which causes ghost or flare. Therefore, it is necessary to provide an anti-reflection function to the optical element manufactured by using the transparent base material.

To provide the anti-reflection function to the optical element, an anti-reflection film is generally formed on a surface of the optical element (transparent base material). The anti-reflection film is formed by laminating thin film layers on the surface of the transparent base material, based on a general optical interference theory.

Methods for forming anti-reflection films include a dry method (vacuum film forming method) and a wet method (wet film forming method). The dry method coats a surface of the transparent base material with metal fluoride or metal oxide having a low refractive index, as with a vapor deposition method and a sputtering method. Further, the wet method applies coating liquid containing a low refractive index material to the surface of the transparent base material by a dipping method, a spin coat method or the like, and then dries or fires it.

A thickness (hereinafter also referred to "film thickness") of the anti-reflection film is frequently designed such that an anti-reflection effect becomes largest at a central part of the optical element (hereinafter referred to as lens), that is, at a portion where an incident angle of a light ray is 0 degree. The anti-reflection film designed as above has a uniform film thickness over the entire lens surface.

However, when a light ray vertically enters the central part of the lens on which the anti-reflection film is formed and light rays enter a peripheral part of the lens in parallel with the above light ray, incident angles of the light rays become large at the peripheral part. Therefore, anti-reflection performance at the peripheral part becomes lower than that of the central part of the lens.

Japanese Patent Laid-open No. 2004-333908 discloses an anti-reflection film having an optical film thickness which makes its reflectance lowest for an entering/emerging light ray at arbitrary positions on a lens surface. According to a general optical interference theory, an optical path length difference between reflected light at a surface of the anti-reflection film and reflected light at a boundary surface between the anti-reflection film and the transparent base material is an odd-numbered times of one-half of a wavelength of the light. Accordingly, these reflected lights interfere with each other to be mutually weakened. Japanese Patent Laid-open No. 2004-333908 utilizes this theory. According to the theory, it is necessary to increase the thickness of the anti-reflection film from the central part of the lens toward the peripheral part thereof.

However, the anti-reflection effect of the anti-reflection film manufactured based on the general optical interference theory depends on the thickness thereof, so that a difference between an actual film thickness and a designed film thickness makes it impossible to obtain a satisfactory anti-reflection effect. Therefore, a highly accurate film thickness control is required for forming the anti-reflection film.

Further, another method for providing the anti-reflection function to the optical element forms a structure having a concave-convex shape finer than a wavelength of entering light (hereinafter referred to as "use wavelength") on the surface of the transparent base material.

In the concave-convex structure finer than the use wavelength, the entering light behaves as if the structure is a uniform medium since the entering light cannot recognize the concave-convex shape. The concave-convex structure has a refractive index according to a volume ratio of a material forming the concave-convex shape, thereby showing a low refractive index that cannot be obtained by normal materials. Consequently, the use of such a concave-convex structure can achieve a higher anti-reflection performance than that of anti-reflection films made of low refractive index materials.

Methods for forming the above described concave-convex structure include a method applying a film in which fine particles having a particle diameter smaller than a use wavelength are dispersed onto a surface of a transparent base material (refer to Japanese Patent No. 3135944), and a method forming a periodic concave-convex structure by pattern formation by using a microfabrication apparatus (refer to Japanese Patent Laid-open No. 50-70040). Further, the methods include a method forming a concave-convex structure of petal-shaped alumina by using a sol-gel method (refer to Japanese Patent Laid-open No. 09-202649).

However, formation of such a concave-convex structure requires complicated processes. Further, the concave-convex structure is formed by using some limited materials, which reduces a degree of freedom in design of the refractive index. Therefore, there is a problem that high anti-reflection performance of the concave-convex structure can be obtained only when using transparent base materials having limited refractive indexes.

Japanese Patent Laid-open No. 2005-275372 discloses a method providing, between a concave-convex structure and a transparent base material, a thin film layer (intermediate layer) formed of a material having a refractive index between those of a material forming the concave-convex structure and the transparent base material. This disclosed method changes the refractive index gradually from the concave-convex structure to the transparent base material, which can reduce reflection at the boundary surface of the transparent base material. Further, selection of a material forming the thin film layer can provide a lot of options in selecting the transparent base material.

The dry method described above such as the sputtering method and the vapor deposition method arranges a vapor deposition source such that it faces the central part of the lens to form a thin film layer. This arrangement enables formation of an anti-reflection film whose anti-reflection performance becomes the maximum at the central part of the lens as designed.

However, when anti-reflection film formation is performed by the dry method on a lens surface having a small curvature radius, an incident angle of a vapor deposition material increases toward the peripheral part, thus reducing the film thickness toward the peripheral part. Generally, when a film thickness at an incident angle of 0 degree is defined as D, a film thickness at an incident angle of 60 degrees is about D×cos(60°), which is about half of the film thickness at the incident angle of 0 degree. Consequently, it is difficult to make the film thickness at the peripheral part larger than that at the central part of the lens based on the optical interference theory by using the dry method. A method disposing a mask can make the film thickness at the peripheral part than that at the central part of the lens, which, however, requires huge equipment.

On the other hand, the wet method described above such as the dipping method and the spin coat method has a low controllability of the film thickness, which makes it difficult to achieve a highly accurate film thickness control.

Further, the anti-reflection structure disclosed in Japanese Patent Laid-open No. 2005-275372 in which the thin film layer is disposed between the concave-convex structure and the transparent base material has better antireflection characteristics in a large wavelength band in comparison with the anti-reflection structure constituted only by the anti-reflection film formed based on the interference theory or the concave-convex structure. However, in the disclosed anti-reflection structure, small reflection occurring at the peripheral part of the lens surface having a small curvature radius generates ghost and flare. Thus, further development in anti-reflection performance is desired.

SUMMARY OF THE INVENTION

The present invention provides an optical element having good anti-reflection performance not only at a central part of an optical surface having a small curvature radius, but also at the peripheral part thereof. Further, the present invention provides an optical system using the optical element and an optical apparatus including the optical system.

The present invention provides as an aspect thereof an optical element including a base member configured to have an optical surface, a concave-convex structure configured to have an average pitch smaller than a shortest wavelength of a use wavelength range, and an intermediate layer formed between the optical surface and the concave-convex structure, made of a material different from that of the concave-convex structure, and having a refractive index between those of the base member and the material of the concave-convex structure. The optical surface is formed into a shape having a rotational symmetry axis. A thickness of the intermediate layer or each of thicknesses of the intermediate layer and the concave-convex structure varies so as to increase as a distance from the rotational symmetry axis increases.

The present invention provides as another aspect thereof an optical system using the above described optical element and an optical apparatus using the optical system.

Other aspects of the present invention will become apparent from the following description and the attached drawings.

DESCRIPTION OF THE EMBODIMENTS

Exemplary embodiments of the present invention will hereinafter be described with reference to the accompanying drawings.

Figure 1:
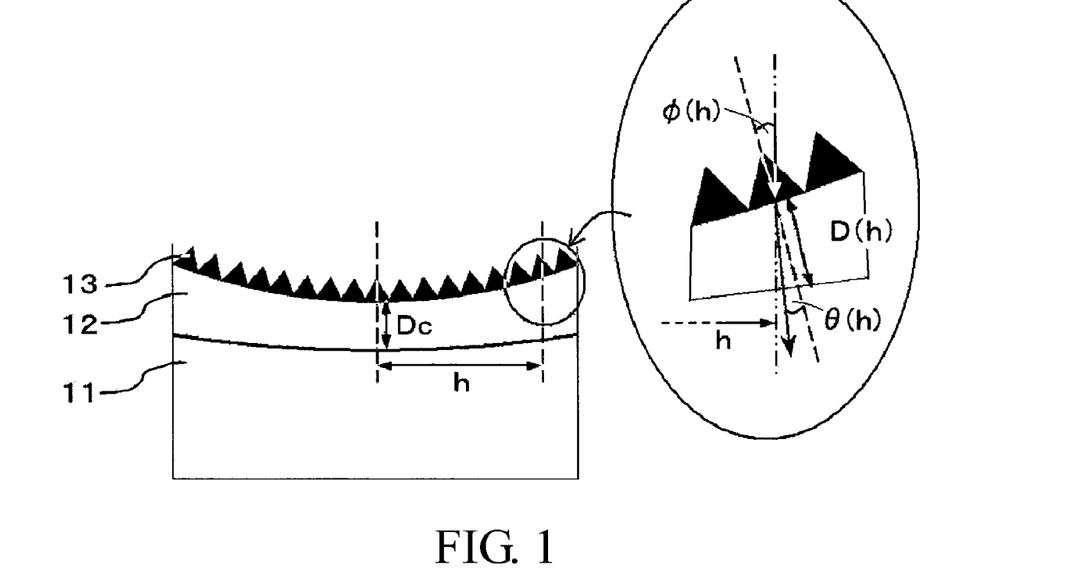
FIG. 1 is a cross-sectional view showing a basic configuration of an optical element that is an embodiment of the present invention.

Before describing specific embodiments, characteristics common to optical elements of the embodiments will be described. FIG. 1 shows a basic configuration of the optical element. FIG. 1 schematically shows a concave-convex structure and an intermediate layer.

The optical element of each embodiment includes a lens 11 as a transparent base material (base member) having a concave lens surface as an optical surface, a thin film layer 12 as an intermediate layer formed on the optical surface, and a concave-convex structure layer 13 as a concave-convex structure including a fine concave-convex shape formed on the thin film layer 12.

The thin film layer 12 is made of a material different from that of the concave-convex structure layer 13, and disposed between the lens surface and the concave-convex structure layer 13. The thin film layer 12 may have a single layer structure or a multi-layer structure in which two or more thin film layers made of mutually different materials are laminated. In other words, it is sufficient that at least one thin film layer is formed between the lens surface and the concave-convex structure layer 13. In a case where the thin film layer 12 is made into a single structure, the thin film layer 12 is made of a material different from that of the concave-convex structure layer 13 and has a refractive index between those of the lens 11 and the material forming the concave-convex structure layer 13. In a case where the thin film layer 12 is made into a multi-layer structure, it is sufficient that at least one of the two or more thin film layers is made of a material different from that of the concave-convex structure layer 13 and has a refractive index between those of the lens 11 and the material forming the concave-convex structure layer 13.

Further, the lens surface of the lens 11 has a shape having a rotational symmetry axis, that is, the lens surface has a rotationally symmetric shape.

Moreover, in the optical element of each embodiment, a thickness (hereinafter also referred to as "film thickness") of the thin film layer 12 or each of thicknesses of the thin film layer 12 and the concave-convex structure layer 13 varies so as to increase as a distance from the rotational symmetry axis increases.

In FIG. 1, Dc denotes a film thickness of the thin film layer 12 at a center of the lens 11, that is, at a position of the rotational symmetry axis (hereinafter referred to as "optical axis") of the lens 11. The position of the rotational symmetry axis of the lens 11 is a position (hereinafter referred to as "optical axis position") where the optical axis crosses the lens surface. In a case where the thin film layer 12 has a multi-layer structure, Dc represents a film thickness of each thin film layer in the multi-layer structure.

Further, h denotes a distance in a direction orthogonal to the optical axis (or a direction along the lens surface) from the optical axis position. D(h) denotes a film thickness of the thin film layer 12 at a position of the distance h from the optical axis position (hereinafter referred to as "h-position").

Further, φ(h) denotes an angle that a light ray reaching the thin film layer 12 at the h-position in parallel with the optical axis forms in a most superficial surface side outside of the thin film layer 12 (that is, in a concave-convex structure layer side outside of the thin film layer 12) with a normal to a most superficial surface of the thin film layer 12 at the h-position. The "most superficial surface" of the thin film layer 12 is a concave-convex structure-side superficial surface thereof, in other words, an uppermost surface closest to the concave-convex structure layer 13.

Moreover, θ(h) denotes an angle that a light ray reaching the thin film layer 12 at the h-position in parallel with the optical axis forms in the thin film layer 12 (in the intermediate layer) with the normal to the most superficial surface of the thin film layer 12 at the h-position.

When n denotes a refractive index of the thin film layer 12, $\phi(h)$ and $\theta(h)$ satisfy the following Snell's equation:

$$\sin(\phi(h))=n\times\sin(\theta(h)).$$

As described above, in a peripheral part of the lens 11 (hereinafter also referred to as "lens peripheral part") having a curvature, incident angles of light rays increase, and therefore anti-reflection performance is deteriorated in comparison with that at a central part of the lens 11 (hereinafter also referred to as "lens central part"). Changing a film thickness of an anti-reflection film according to a position on a lens surface such that a typical optical interference theory is satisfied makes it possible to provide good anti-reflection performance. However, the anti-reflection performance of the anti-reflection film based on the typical optical interference theory largely depends on the film thickness, so that even a small difference of an actual film thickness from a designed film thickness deteriorates the anti-reflection performance.

Accordingly, in each embodiment, the thin film layer 12 is provided between the concave-convex structure layer 13 and the lens 11 (lens surface).

The concave-convex structure layer 13 is formed by a concave-convex structure whose average pitch is sufficiently smaller than that of a shortest wavelength in a use wavelength range that is a wavelength range of light entering the optical element. The pitch means, when one convex portion and one concave portion adjacent thereto are defined as one set of concave and convex portions, a distance between two sets of concave and convex portions adjacent to each other.

Further, a configuration (shape) of the concave-convex structure layer 13 varies in its thickness direction. Specifically, a width of the convex portion increases from a light entrance side on which light reaches the optical element toward a thin film layer 12 side (or a lens 11 side), a width of the concave portion decreases from the thin film layer 12 side toward the light entrance side. Therefore, the concave-convex structure layer 13 can be considered as a structure whose refractive index varies continuously in its thickness direction. The continuous variation of the refractive index generates in the structure innumerable reflected lights whose amplitudes are small, and the reflected lights interfere with each other to be mutually reduced. Reflected lights generated at a boundary surface between the thin film layer 12 and the lens 11 mutually interfere innumerably to be mutually reduced in the structure, so that the anti-reflection performance has a little dependency on film thickness accuracy.

Consequently, the optical element of each embodiment is more insensitive to the film thickness in comparison with an optical element having a conventional anti-reflection film. As a result, the optical element of each embodiment has a certain margin (tolerance) in the film thickness accuracy in the lens peripheral part at which incident angles of light rays are large.

The above described configuration can realize an optical element having satisfactory anti-reflection performance not only at the lens central part having a small curvature radius but also at the lens peripheral part and excellent mass productivity.

It is desired that the optical element of each embodiment satisfy, for $\theta(h)$ which satisfies:

$$0.3 \leq n \times \sin(\theta(h)) < 1 \qquad (1),$$

the following condition:

$$Dc < D(h) < Dc/\cos(\theta(h)) \qquad (2).$$

Further, it is more desired that the optical element of each embodiment satisfy the following condition instead of the above condition (2):

$$(Dc/2)\times(1/\cos(\theta(h))+1) < D(h) < Dc/\cos(\theta(h)) \qquad (3).$$

Moreover, it is more preferable that the optical element of each embodiment satisfy the following condition:

$$\lambda/(8\times n) \leq Dc \leq (2\times\lambda)/n \qquad (4)$$

where $\lambda$ represents the shortest wavelength of the use wavelength range.

Furthermore, in a case where the optical element of each embodiment is used in an optical system such as an image-forming optical system or an observation optical system, it is preferable that the optical element satisfy, for $\psi(h)$ which satisfies:

$$0.3 \leq n \times \sin(\psi(h)) < 1 \qquad (5)$$

the following condition:

$$Dc < D(h) < Dc/\cos(\psi(h)) \qquad (6)$$

where $\psi(h)$ represents an angle that a light ray having an average incident angle among all light rays passing through the h-position of the thin film layer 12 in an optical system forms in the thin film layer 12 (in the intermediate layer) with a normal to the most superficial surface of the thin film layer 12 at the h-position.

Further, it is more preferable that the optical element satisfy the following condition instead of the condition (6):

$$(Dc/2)\times(1/\cos(\psi(h))+1) < D(h) < Dc/\cos(\psi(h)) \qquad (7).$$

Still further, in a case where the optical element of each embodiment is used in an optical system, such as an image-forming optical system or an observation optical system, including an aperture stop, it is preferable that the optical element satisfy, for $\zeta(h)$ which satisfies:

$$0.3 \leq n \times \sin(\zeta(h)) < 1 \qquad (8),$$

the following condition:

$$Dc < D(h) < Dc/\cos(\zeta(h)) \qquad (9)$$

where $\zeta(h)$ represents an angle that a light ray passing through the h-position of the thin film layer 12 and a center of the aperture stop in the optical system forms in the thin film layer 12 (in the intermediate layer) with a normal to the most superficial surface of the thin film layer 12 at the h-position.

Further, it is preferable that the optical element satisfy the following condition instead of the condition (9):

$$(Dc/2)\times(1/\cos(\zeta(h))+1) < D(h) < Dc/\cos(\zeta(h)) \qquad (10).$$

Satisfying at least one of the above described conditions (2), (3), (6), (7), (9) and (10) makes it possible to more surely obtain an optical element having good anti-reflection performance also in the lens peripheral part and excellent mass productivity.

The thin film layer 12 in each embodiment can be formed by arbitrary methods. For example, the thin film layer 12 may be formed by a dry method (vacuum film forming method) such as a sputtering method or a vapor deposition method. Alternatively, the thin film layer 12 may be formed by a wet method (wet film forming method) such as a dipping method or a spin coat method using sol-gel coating liquid.

Each of the above-described methods forms, after forming the thin film layer 12 on the lens surface of the lens 11, the concave-convex structure layer 13 on the most superficial surface of the thin film layer 12. The concave-convex structure layer 13 can also be formed by arbitrary methods such as a method applying a film in which fine particles having a particle diameter smaller than the use wavelength are dispersed onto the most superficial surface of the thin film layer 12 or a method forming a concave-convex structure of petal-shaped alumina by using a sol-gel method.

Further, the material for forming the thin film layer 12 is not particularly limited if the material is different from that of the concave-convex structure layer 13. However, it is preferable that the material contain at least one of zirconia, silica, titania or zinc oxide. It is also preferable that the concave-convex structure layer 13 be mainly made of alumina.

Next, description will be made of the method forming the thin film layer 12 and the concave-convex structure layer 13 by using the spin coat method.

To form the thin film layer 12 on the lens surface of the lens 11, an $SiO_2$ sol liquid and a $TiO_2$ sol liquid are first mixed and stirred. The mixed liquid as an $SiO_2$—$TiO_2$ coating liquid is applied onto the lens surface by using the spin coat method. After the application of the mixed liquid, the lens 11 is subjected to a heating process at several hundred degrees and further subjected to a drying process, thereby obtaining a transparent amorphous $SiO_2/TiO_2$ film. The refractive index of the thin film layer 12 is decided depending on a molar ratio of the $SiO_2$ sol liquid and $TiO_2$ sol liquid mixed with each other. The film thickness of the thin film layer 12 is controlled by a rotation speed of the lens 11 or a viscosity of the coating liquid used in the spin coat method.

Then, a sol-gel coating liquid containing alumina is applied on the most superficial surface of the thin film layer 12 to form a gel film thereon. Subsequently, the gel film is dipped into heated water to precipitate plate crystals mainly containing alumina, and thereby the concave-convex structure is formed whose convex portions are formed by the precipitated crystals.

The dipping of the gel film into heated water provides peptization or the like to part of a superficial layer of the gel film formed by applying the sol-gel coating liquid containing alumina, and thereby components included in the gel film liquate out from the part. Differences in solubility of respective hydroxides for the heated water precipitate the plate crystals mainly containing alumina on the superficial surface layer of the gel film, and then the precipitated crystals grow to form the concave-convex structure. A preferred temperature of the heated water is a temperature from 40 degrees to 100 degrees. A preferred heated water treatment time is between about 5 minutes and about 24 hours.

In each embodiment, the lens 11 as the transparent base material is formed of optical glass or optical plastic. The transparent base material may be formed into any shape, such as a plate shape, a film shape or a sheet shape, other than a lens shape as far as the transparent base material has an optical surface and is formed into a shape suitable for a final intended purpose.

The specific embodiments will be hereinafter described below. The use wavelength range of each embodiment is a wavelength range of 400 to 700 nm, and a central wavelength of the use wavelength range is 550 nm. However, those values are only for the sake of examples. Embodiments of the present invention are not limited thereto.

Embodiment 1

In a first embodiment (Embodiment 1) of the present invention, the film thickness of the thin film layer 12 having a single layer structure varies so as to gradually increase from the optical axis position toward an outer edge of the lens peripheral part, and the thickness of the concave-convex structure layer 13 is uniform over the entire lens surface.

In Embodiment 1, a meniscus lens having an outer diameter of 51 mm and a refractive index of 2.0 was used as the transparent base material. After applying the $SiO_2$—$TiO_2$ coating liquid onto a concave lens surface of the lens having a diameter of 38 mm and a curvature radius of 20.3 mm by the spin coat method, the heating process and the drying process were performed to form the thin film layer 12. Then, the sol-gel coating liquid containing alumina was applied on the thin film layer 12 to form a gel film, and followed by dipping it into heated water to precipitate plate crystals mainly containing alumina. Thus, the concave-convex structure layer 13 was formed.

The thickness and the refractive index of the respective layers were measured by using an ellipsometer. The same measurement is performed also in the other embodiments described later.

The thickness of the concave-convex structure layer 13 was 160 nm at every position on the lens surface. Further, the refractive index of the concave-convex structure layer 13 continuously reduced from 1.3 to 1.0 from the thin film layer side toward the light entrance side (air side). The refractive index n of the thin film layer 12 was 1.64, and the film thickness thereof smoothly increased from the optical axis position toward the outer edge of the lens peripheral part.

Table 1 shows the distance h from the optical axis position, $\phi(h)$ at the h-position, the film thickness D(h) of the thin film layer 12, $Dc/cos(\theta(h))$ in the condition (2), the thickness Ds(h) of the concave-convex structure layer 13, and an average reflectance $R_a(h)$ in the wavelength range from 400 to 700 nm in Embodiment 1.

As shown in Table 1, the film thickness of the thin film layer 12 in Embodiment 1 satisfies the condition (2).

Figure 2:
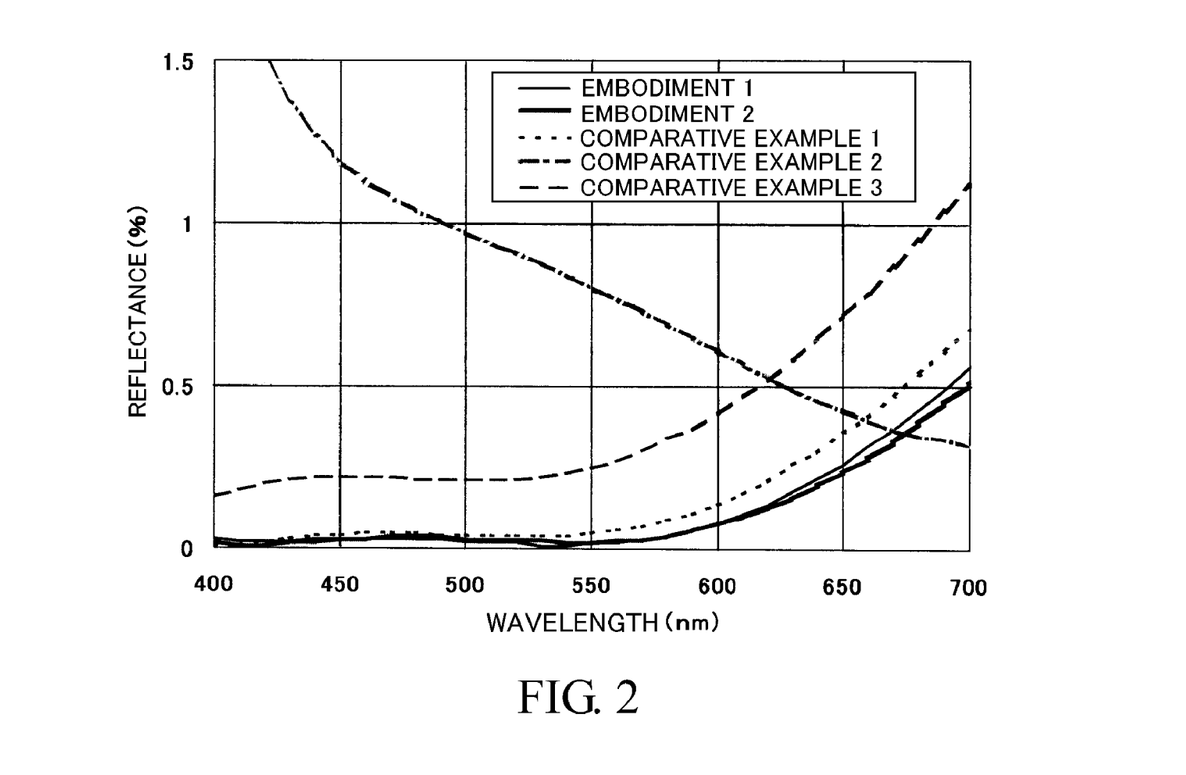
FIG. 2 shows reflectance characteristics of each of first and second embodiments of the present invention and those of each of first through third comparative examples.

FIG. 2 shows reflectance characteristics in the wavelength range from 400 to 700 nm at a position of a distance h=10.2 mm. Embodiment 1 achieved very good reflectance characteristics in which the reflectance was 0.6% or less in the wavelength range from 400 to 700 nm.

Further, as shown in Table 1, Embodiment 1 achieved very good average reflectance characteristics in which an average reflectance Ra(10.2) at the distance h=10.2 mm was 0.12% and an average reflectance Ra(17.6) at a distance h=17.6 mm was 2.08% in the wavelength range from 400 to 700 nm.

Embodiment 2

A second embodiment (Embodiment 2) of the present invention will describe a case where each of the film thickness of the thin film layer 12 having a single layer structure and the thickness of the concave-convex structure layer 13 varies so as to gradually increase from the optical axis position toward the outer edge of the lens peripheral part.

Embodiment 2 formed the thin film layer 12 on a meniscus lens (lens surface) and formed the concave-convex structure layer 13 on the thin film layer 12, by a similar method to that in Embodiment 1.

The thickness of the concave-convex structure layer 13 smoothly increased from the optical axis position toward the outer edge of the lens peripheral part. The refractive index of the concave-convex structure layer 13 continuously reduced from 1.3 to 1.0 from the thin film layer side toward the light entrance side. The refractive index n of the thin film layer 12 was 1.64, and the film thickness thereof smoothly increased from the optical axis position toward the outer edge of the lens peripheral part.

Table 1 shows h, $\phi(h)$, D(h), $Dc/cos(\theta(h))$, Ds(h) and the average reflectance $R_a(h)$ in Embodiment 2.

As shown in Table 1, the film thickness of the thin film layer 12 in Embodiment 2 satisfies the condition (2).

Further, as shown in FIG. 2, Embodiment 2 achieved very good reflectance characteristics in which the reflectance at a position of a distance h=10.2 mm was 0.6% or less in the wavelength range from 400 to 700 nm.

Further, as shown in Table 1, Embodiment 2 achieved very good average reflectance characteristics in which an average reflectance Ra(10.2) at the distance h=10.2 mm was 0.11% and an average reflectance Ra(17.6) at a distance h=17.6 mm was 1.18% in the wavelength range from 400 to 700 nm.

Embodiment 3

A third embodiment (Embodiment 3) of the present invention will describe a case where the film thickness of the thin film layer 12 having a multi-layer (two-layer) structure varies so as to gradually increase from the optical axis position toward the outer edge of the lens peripheral part and the thickness of the concave-convex structure layer 13 is uniform over the entire lens surface.

Embodiment 3 formed the thin film layer 12 on a meniscus lens (lens surface) and formed the concave-convex structure layer 13 on the thin film layer 12, by a similar method to that in Embodiment 1.

The thickness of the concave-convex structure layer 13 was 195 nm at every position on the lens surface. Further, the refractive index of the concave-convex structure layer 13 continuously reduced from 1.36 to 1.0 from the thin film layer side toward the light entrance side. A refractive index $n_1$ of a thin film layer of the two-layered thin film layer 12 closer to the concave-convex structure layer 13 was 1.64, and a refractive index $n_2$ of another thin film layer closer to the lens surface was 1.74. Thus, in the case where the thin film layer 12 is formed into a multi-layer structure, it is preferable to form the thin film layer 12 such that the refractive indexes of the respective thin film layer decrease from a lens side to a concave-convex structure layer side in order to suppress Fresnel reflection. Further, the film thickness of each of the two thin film layers smoothly increased from the optical axis position toward the outer edge of the lens peripheral part.

Table 2 shows h, $\phi$(h), a film thickness $D_1$(h) of the thin film layer of the two-layered thin film layer 12 closer to the concave-convex structure layer 13 and $Dc_1/\cos(\theta(h))$ in the condition (2) in Embodiment 3. Further, Table 2 shows a film thickness $D_2$(h) of the thin film layer of the two-layered thin film layer 12 closer to the lens surface, $Dc_2/\cos(\theta(h))$ in the condition (2), Ds(h) and an average reflectance Ra(h).

As shown in Table 2, the film thickness of each thin film layer of the two-layered thin film layer 12 in Embodiment 3 satisfies the condition (2).

Figure 3:
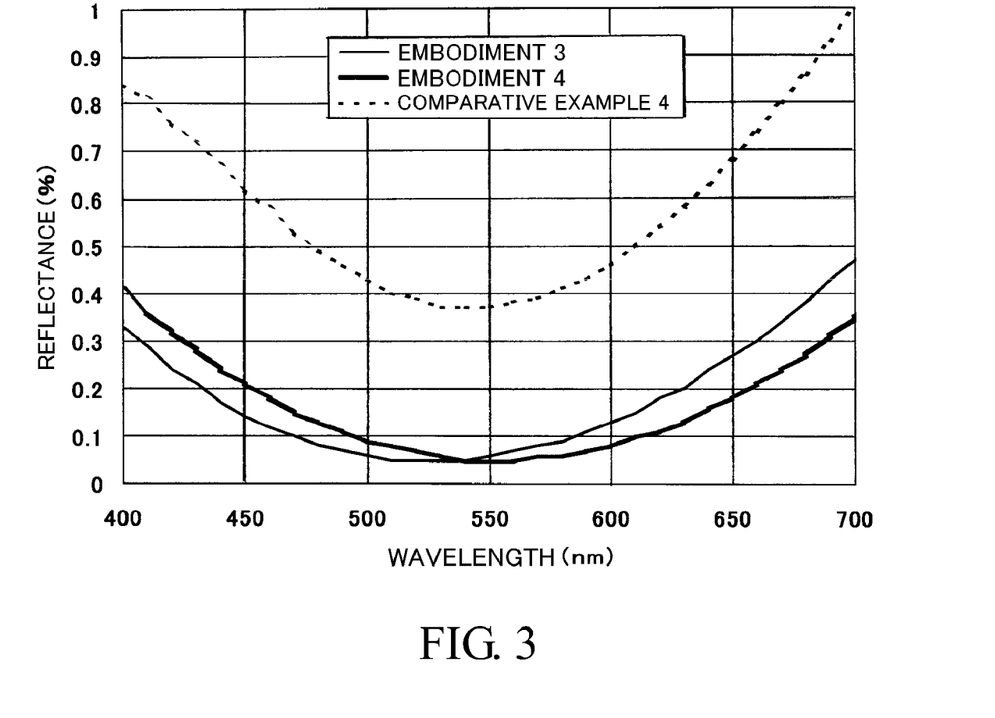
FIG. 3 shows reflectance characteristics of each of third and fourth embodiments of the present invention and those of a fourth comparative example.

FIG. 3 shows reflectance characteristics in the wavelength range from 400 to 700 nm at a position of a distance h=10.2 mm. Embodiment 3 achieved very good reflectance characteristics in which the reflectance was 0.5% or less in the wavelength range from 400 to 700 nm.

Further, as shown in Table 2, Embodiment 3 achieved very good average reflectance characteristics in which an average reflectance Ra(10.2) at the distance h=10.2 mm was 0.32% and an average reflectance Ra(17.6) at a distance h=17.6 mm was 2.16% in the wavelength range from 400 to 700 nm.

Embodiment 4

A fourth embodiment (Embodiment 4) of the present invention will describe a case where each of the film thickness of the thin film layer 12 having a multi-layer (two-layer) structure and the thickness of the concave-convex structure layer 13 varies so as to gradually increase from the optical axis position toward the outer edge of the lens peripheral part.

Embodiment 4 formed the thin film layer 12 on a meniscus lens (lens surface) and formed the concave-convex structure layer 13 on the thin film layer 12, by a similar method to that in Embodiment 1.

The thickness of the concave-convex structure layer 13 smoothly increased from the optical axis position toward the outer edge of the lens peripheral part. Further, the refractive index of the concave-convex structure layer 13 continuously reduced from 1.36 to 1.0 from the thin film layer side toward the light entrance side. A refractive index $n_1$ of a thin film layer of the two-layered thin film layer 12 closer to the concave-convex structure layer 13 was 1.64, and a refractive index $n_2$ of another thin film layer closer to the lens surface was 1.74. The film thicknesses of those two thin film layers smoothly increased from the optical axis position toward the outer edge of the lens peripheral part.

Table 2 shows h, $\phi$(h), a film thickness $D_1$(h) of the thin film layer of the two-layered thin film layer 12 closer to the concave-convex structure layer 13 and $Dc_1/\cos(\theta(h))$ in the condition (2) in Embodiment 4. Further, Table 2 shows a film thickness $D_2$(h) of the thin film layer of the two-layered thin film layer 12 closer to the lens surface, $Dc_2/\cos(\theta(h))$ in the condition (2), Ds(h) and an average reflectance Ra(h).

As shown in Table 2, the film thickness of each thin film layer of the two-layered thin film layer 12 in Embodiment 4 satisfies the condition (2).

Further, as shown in FIG. 3, Embodiment 4 achieved very good reflectance characteristics in which the reflectance at a position of a distance h=10.2 mm was 0.5% or less in the wavelength range from 400 to 700 nm.

Further, as shown in Table 2, Embodiment 4 achieved very good average reflectance characteristics in which an average reflectance Ra(10.2) at the distance h=10.2 mm was 0.27% and an average reflectance Ra(17.6) at a distance h=17.6 mm was 1.16% in the wavelength range from 400 to 700 nm.

Comparative examples 1 to 4 for Embodiments 1 to 4 will hereinafter be described.

Comparative Example 1

A first comparative example (Comparative Example 1) will describe a case where both of the film thickness of the thin film layer having a single layer structure and the thickness of the concave-convex structure layer are uniform over the entire lens surface, for the sake of comparison with Embodiments 1 and 2.

Comparative Example 1 formed the thin film layer on a meniscus lens (lens surface) and formed the concave-convex structure layer on the thin film layer, by a similar method to that in Embodiment 1.

The thickness of the concave-convex structure layer was 160 nm at every position on the lens surface. Further, the refractive index of the concave-convex structure layer continuously reduced from 1.3 to 1.0 from the thin film layer side toward the light entrance side. The refractive index of the thin film layer was 1.64, and the film thickness thereof was constantly 65 nm over the entire lens from the optical axis position to the outer edge of the lens peripheral part.

Table 1 shows h, $\phi$(h), D(h), Dc/cos ($\theta$(h)), Ds(h) and an average reflectance Ra(h) in Comparative Example 1.

As shown in Table 1, the film thickness of the thin film layer of Comparative Example 1 does not satisfy the condition (2).

FIG. 2 shows reflectance characteristics in the wavelength range from 400 to 700 nm at a position of a distance h=10.2 mm. Comparative Example 1 provided a reflectance higher than those in Embodiments 1 and 2 in the wavelength range from 500 to 700 nm.

Further, as shown in Table 1, in Comparative Example 1, an average reflectance Ra(10.2) at the distance h=10.2 mm was 0.16% and an average reflectance Ra(17.6) at a distance h=17.6 mm was 2.13% in the wavelength range from 400 to 700 nm.

As seen from the above, the anti-reflection performance of Comparative Example 1 is lower than those of Embodiments 1 and 2.

Comparative Example 2

A second comparative example (Comparative Example 2) will describe a case where the film thickness of the thin film layer having a single layer structure varies so as to extremely increase from the optical axis position toward the outer edge of the lens peripheral part and the thickness of the concave-convex structure layer is uniform over the entire lens surface, for the sake of comparison with Embodiments 1 and 2.

Comparative Example 2 formed the thin film layer on a meniscus lens (lens surface) and formed the concave-convex structure layer on the thin film layer, by a similar method to that in Embodiment 1.

The thickness of the concave-convex structure layer was 160 nm at every position on the lens surface. Further, the refractive index of the concave-convex structure layer continuously reduced from 1.3 to 1.0 from the thin film layer side toward the light entrance side. The refractive index of the thin film layer was 1.64, and the film thickness thereof was remarkably increased from the optical axis position toward the outer edge of the lens peripheral part.

Table 1 shows h, $\phi$(h), D(h), Dc/cos ($\theta$(h)), Ds(h) and an average reflectance Ra(h) in Comparative Example 2.

As shown in Table 1, the film thickness of the thin film layer of Comparative Example 2 does not satisfy the condition (2).

FIG. 2 shows reflectance characteristics in the wavelength range from 400 to 700 nm at a position of a distance h=10.2 mm. Comparative Example 2 provided a reflectance higher than those in Embodiments 1 and 2 in the wavelength range from 400 to 670 nm.

Further, as shown in Table 1, in Comparative Example 2, an average reflectance Ra(10.2) at the distance h=10.2 mm was 0.85% and an average reflectance Ra(17.6) at a distance h=17.6 mm was 4.96% in the wavelength range from 400 to 700 nm.

As seen from the above, the anti-reflection performance of Comparative Example 2 is lower than those of Embodiments 1 and 2.

Comparative Example 3

A third comparative example (Comparative Example 3) will describe a case where the thin film layer having a single layer structure is formed by the vacuum vapor deposition method, and thereafter the concave-convex structure layer is formed by the spin coat method, for the sake of comparison with Embodiments 1 and 2.

The film thickness of the thin film layer varies so as to decrease from the optical axis position toward the outer edge of the lens peripheral part, and the thickness of the concave-convex structure is uniform over the entire lens surface.

In Comparative Example 3, an alumina (Al2O3) layer having a refractive index of 1.64 as a thin film layer was formed on a meniscus lens (lens surface) having the same shape as that of the meniscus lens in Embodiment 1 by the vacuum vapor deposition method. Then, the concave-convex structure layer was formed on the alumina thin film layer by the spin coat method using the sol-gel coating liquid.

The thickness of the concave-convex structure layer was 160 nm at every position on the lens surface. Further, the refractive index of the concave-convex structure layer continuously decreased from 1.3 to 1.0 from the thin film layer side to the light entrance side, as with Embodiments 1 and 2.

The film thickness of the thin film layer smoothly decreased from 65 nm at the optical axis position toward the outer edge of the lens peripheral part.

Table 1 shows h, $\phi$(h), D(h), Dc/cos ($\theta$(h)), Ds(h) and an average reflectance Ra(h) in Comparative Example 3.

As shown in Table 1, the film thickness of the thin film layer of Comparative Example 3 does not satisfy the condition (2).

FIG. 2 shows reflectance characteristics in the wavelength range from 400 to 700 nm at a position of a distance h=10.2 mm. Comparative Example 3 provided a reflectance about twice as high as those in Embodiments 1 and 2 in the wavelength range from 400 to 700 nm.

Further, as shown in Table 1, in Comparative Example 3, an average reflectance Ra(10.2) at the distance h=10.2 mm was 0.41% and an average reflectance Ra(17.6) at a distance h=17.6 mm was 4.17% in the wavelength range from 400 to 700 nm.

As seen from the above, the anti-reflection performance of Comparative Example 3 is lower than that of Embodiments 1 and 2.

Comparative Example 4

A fourth comparative example (Comparative Example 4) will describe a case where the thin film layer having a two-layer structure is formed by the vacuum vapor deposition method, and thereafter the concave-convex structure layer is formed by the spin coat method, for the sake of comparison with Embodiments 3 and 4. The film thickness of the thin film layer varies so as to decrease from the optical axis position toward the outer edge of the lens peripheral part, and the thickness of the concave-convex structure is uniform over the entire lens surface.

In Comparative Example 4, two layers including a magnesium oxide thin film layer having a refractive index of 1.74 and an alumina (Al2O3) thin film layer having a refractive index of 1.64 were formed on a meniscus lens (lens surface) having the same shape as that of the meniscus lens in Embodiment 1 by the vacuum vapor deposition method. Then, the concave-convex structure layer was formed on the alumina thin film layer by the spin coat method using the sol-gel coating liquid.

The thickness of the concave-convex structure layer was 195 nm at every position on the lens surface. Further, the refractive index of the concave-convex structure layer continuously decreased from 1.36 to 1.0 from the thin film layer side to the light entrance side, as with Embodiments 3 and 4. The film thickness of the magnesium oxide thin film layer at the optical axis position was 43 nm, and that of the alumina thin film layer at the optical axis position was 79 nm. These film thicknesses smoothly decreased from the optical axis position toward the outer edge of the lens peripheral part.

Table 2 shows h, $\phi$(h), a film thickness D1(h) and Dc1/cos ($\theta$(h)) of the magnesium oxide thin film layer of the two-layered structure thin film layer closer to the concave-convex structure layer in Comparative Example 4. Further, Table 2 shows a film thickness D2(h) and Dc2/cos($\theta$(h)) of the alumina thin film layer of the two-layered structure thin film layer closer to the lens surface. Moreover, Table 2 shows Ds(h) and an average reflectance Ra(h).

As shown in Table 2, each of the film thicknesses of the two thin film layers of Comparative Example 4 does not satisfy the condition (2).

FIG. 3 shows reflectance characteristics in the wavelength range from 400 to 700 nm at a position of a distance h=10.2 mm. Comparative Example 4 provided a reflectance twice or more than those of the Embodiments 3 and 4 in the wavelength range from 400 to 700 nm.

Further, as shown in Table 2, in Comparative Example 4, an average reflectance Ra(10.2) at the distance h=10.2 mm was 0.78% and an average reflectance Ra(17.6) at a distance h=17.6 mm was 2.70% in the wavelength range from 400 to 700 nm.

As seen from the above, the anti-reflection performance of Comparative Example 4 is lower than that of Embodiments 3 and 4.

Although not shown as a specific comparative example, the inventor found that an anti-reflection structure including a thin film layer having a two-layer structure and a concave-convex structure layer also provides low anti-reflection performance in a case where the film thickness of the thin film layer is uniform over the entire lens surface and in a case where the film thickness of the thin film layer remarkably increases from the optical axis position toward the outer edge of the lens peripheral part.

As described above, each of Embodiments 1 to 4 can realize an optical element having high anti-reflection performance not only at the lens central part whose curvature radius is small, but also at the lens peripheral part and excellent mass productivity.

Embodiment 5

Figure 4:
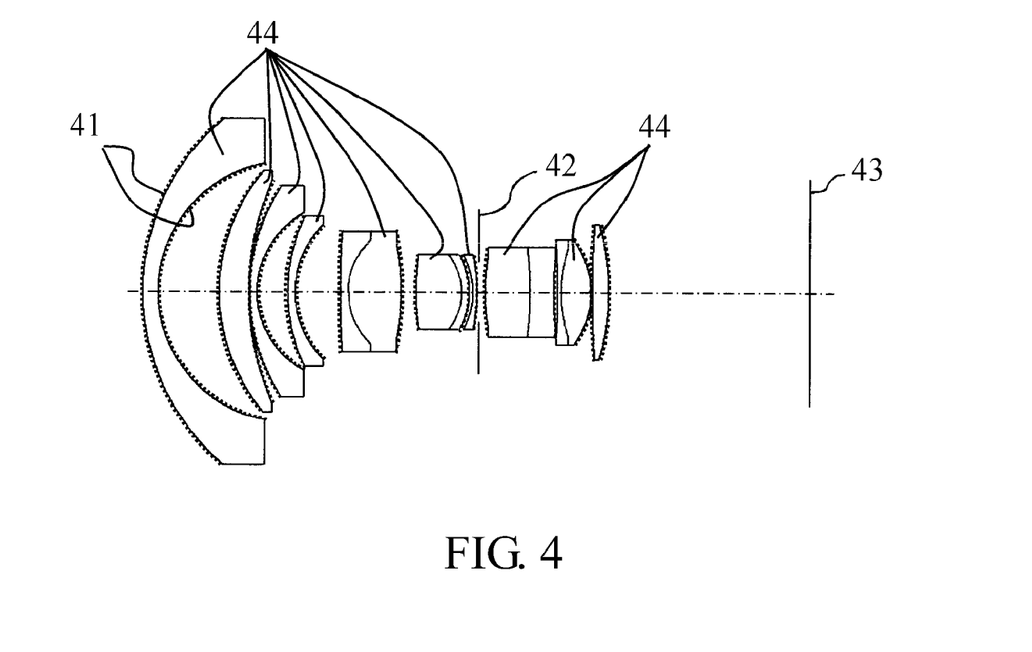
FIG. 4 is a cross-sectional view showing a configuration of an image-pickup optical system that is a fifth embodiment of the present invention.

FIG. 4 shows an image pickup optical system (image-forming optical system) using the optical element described in each of Embodiments 1 to 4. The image pickup optical system is used in an optical apparatus such as a digital camera, a video camera, and an interchangeable lens.

In FIG. 4, reference numeral 43 denotes an image pickup plane at which a solid-state image pickup element (photoelectric conversion element) such as a CCD sensor or a CMOS sensor is disposed. Reference numeral 42 denotes an aperture stop.

Reference numeral 44 denotes a lens as the optical element. On at least one of an entrance surface and an exit surface of the lens 44, an anti-reflection structure 41 (illustrated by plural dots in FIG. 4) is formed which is constituted by the thin film layer 12 and the concave-convex structure layer 13 described in Embodiments 1 to 4.

The use wavelength range of the image-pickup optical system of this embodiment is a visible range. The shortest wavelength in the use wavelength range is 400 nm.

It is preferable that $\psi(h)$ in this embodiment be an angle that a light ray whose incident angle is an average value of incident angles of all light rays passing through the position away from the optical axis position by the distance h forms with the normal to the most superficial surface of the thin film layer.

Further, it is preferable that $\zeta(h)$ in the optical system of this embodiment be an angle that a light ray passing through the position away from the optical axis position by the distance h and a center of the aperture stop 42 forms in the thin film layer with the normal to the most superficial surface of the thin film layer.

Furthermore, the present invention is not limited to these embodiments and various variations and modifications may be made without departing from the scope of the present invention.

This application claims the benefit of Japanese Patent Application No. 2009-184144, filed on Aug. 7, 2009 and

TABLE 1

| | DISTANCE FROM OPTICAL AXIS h (mm) | $\phi(h)$ (°) | FILM THICKNESS (nm) | $Dc/\cos(\theta(h))$ | THICKNESS OF CONCAVE-CONVEX SHAPE $D_s(h)$ (nm) | AVERAGE REFLECTANCE $R_a(h)$ (%) |
|---|---|---|---|---|---|---|
| Embodiment 1 | 0.0 | 0 | 65.0 (=Dc) | 65.0 | 160 | 0.11 |
| | 10.2 | 30 | 68.0 | 68.2 | 160 | 0.12 |
| | 17.6 | 60 | 76.0 | 76.4 | 160 | 2.08 |
| Embodiment 2 | 0.0 | 0 | 65.0 (=Dc) | 65.0 | 160 | 0.11 |
| | 10.2 | 30 | 68.0 | 68.2 | 164 | 0.11 |
| | 17.6 | 60 | 76.0 | 76.4 | 188 | 1.18 |
| Comparative Example 1 | 0.0 | 0 | 65.0 (=Dc) | 65.0 | 160 | 0.11 |
| | 10.2 | 30 | 65.0 | 68.2 | 160 | 0.16 |
| | 17.6 | 60 | 65.0 | 76.4 | 160 | 2.13 |
| Comparative Example 2 | 0.0 | 0 | 65.0 (=Dc) | 65.0 | 160 | 0.11 |
| | 10.2 | 30 | 98.0 | 68.2 | 160 | 0.85 |
| | 17.6 | 60 | 126.0 | 76.4 | 160 | 4.96 |
| Comparative Example 3 | 0.0 | 0 | 65.0 (=Dc) | 65.0 | 160 | 0.11 |
| | 10.2 | 30 | 56.3 | 68.2 | 160 | 0.41 |
| | 17.6 | 60 | 32.5 | 76.4 | 160 | 4.17 |

TABLE 2

| | DISTANCE FROM OPTICAL AXIS h (mm) | $\phi(h)$ (°) | FILM THICKNESS $D_1(h)$ (nm) | FILM THICKNESS $D_2(h)$ (nm) | $Dc_1/\cos(\theta(h))$ | $Dc_2/\cos(\theta(h))$ | THICKNESS OF CONCAVE-CONVEX SHAPE $D_s(h)$ (nm) | AVERAGE REFLECTANCE $R_a(h)$ (%) |
|---|---|---|---|---|---|---|---|---|
| Embodiment 3 | 0.0 | 0 | 43 (=$Dc_1$) | 79 (=$Dc_2$) | 43.0 | 79.0 | 195 | 0.25 |
| | 10.2 | 30 | 45.0 | 82.0 | 45.2 | 82.5 | 195 | 0.32 |
| | 17.6 | 60 | 50.0 | 90.0 | 50.8 | 91.1 | 195 | 2.61 |
| Embodiment 4 | 0.0 | 0 | 43 (=$Dc_1$) | 79 (=$Dc_2$) | 43.0 | 79.0 | 203 | 0.25 |
| | 10.2 | 30 | 45.0 | 82.0 | 45.2 | 82.5 | 203 | 0.27 |
| | 17.6 | 60 | 50.0 | 90.0 | 50.8 | 91.1 | 224 | 1.69 |
| Comparative Example 4 | 0.0 | 0 | 43 (=$Dc_1$) | 79 (=$Dc_2$) | 43.0 | 79.0 | 195 | 0.25 |
| | 10.2 | 30 | 37.0 | 68.0 | 45.2 | 82.5 | 195 | 0.78 |
| | 17.6 | 60 | 21.5 | 39.5 | 50.8 | 91.1 | 195 | 2.70 |

2008-222899, filed on Aug. 29, 2008 which are hereby incorporated by reference herein in their entirety.

What is claimed is:

1. An optical element comprising:
a base member configured to have an optical surface;
a concave-convex structure configured to have an average pitch smaller than a shortest wavelength of a use wavelength range; and
an intermediate layer formed between the optical surface and the concave-convex structure, made of a material different from that of the concave-convex structure, and having a refractive index between a refractive index of the base member and a refractive index of the material of the concave-convex structure,
wherein the optical surface is formed into a shape having a rotational symmetry axis,
wherein a thickness of the intermediate layer or each of thicknesses of the intermediate layer and the concave-convex structure varies so as to increase as a distance from the rotational symmetry axis increases, and
wherein the optical element satisfies the following condition for θ(h) that satisfies a condition of $0.3 \leq n \times \sin(\theta(h)) < 1$:

$$Dc < D(h) < Dc/\cos(\theta(h))$$

where Dc represents the thickness of the intermediate layer at a position of the rotational symmetry axis, n represents the refractive index of the intermediate layer, D(h) represents the thickness of the intermediate layer at a h-position away from the rotational symmetry axis by a distance h, and θ(h) represents an angle that a light ray reaching the intermediate layer at the h-position in parallel with the rotational symmetry axis forms in the intermediate layer with a normal to a concave-convex structure-side most superficial surface of the intermediate layer at the h-position.

2. The optical element according to claim 1, wherein the concave-convex structure varies in structure in its thickness direction.

3. The optical element according to claim 1, wherein the following condition is satisfied:

$$\lambda/(8 \times n) \leq Dc \leq (2 \times \lambda)/n$$

where Dc represents the thickness of the intermediate layer at a position of the rotational symmetry axis, n represents the refractive index of the intermediate layer, and λ represents the shortest wavelength of the used wavelength range.

4. An optical system comprising:
an optical element,
wherein the optical element comprising:
a base member configured to have an optical surface;
a concave-convex structure configured to have an average pitch smaller than a shortest wavelength of a use wavelength range; and
an intermediate layer formed between the optical surface and the concave-convex structure, made of a material different from that of the concave-convex structure, and having a refractive index between a refractive index of the base member and a refractive index of the material of the concave-convex structure,
wherein the optical surface is formed into a shape having a rotational symmetry axis,
wherein a thickness of the intermediate layer or each of thicknesses of the intermediate layer and the concave-convex structure varies so as to increase as a distance from the rotational symmetry axis increases, and
wherein the optical element satisfies the following condition for ψ(h) that satisfies a condition of $0.3 \leq n \times \sin(\psi(h)) < 1$:

$$Dc < D(h) < Dc/\cos(\psi(h))$$

where Dc represents the thickness of the intermediate layer at a position of the rotational symmetry axis, n represents the refractive index of the intermediate layer, D(h) represents the thickness of the intermediate layer at a h-position away from the rotational symmetry axis by a distance h, and ψ(h) represents an angle that a light ray having an average incident angle among all light rays passing through the h-position of the intermediate layer in the optical system forms in the intermediate layer with a normal to a concave-convex structure-side most superficial surface of the intermediate layer at the h-position.

5. An optical system comprising:
an optical element; and
an aperture stop,
wherein the optical element comprising:
a base member configured to have an optical surface;
a concave-convex structure configured to have an average pitch smaller than a shortest wavelength of a use wavelength range; and
an intermediate layer formed between the optical surface and the concave-convex structure, made of a material different from that of the concave-convex structure, and having a refractive index between a refractive index of the base member and a refractive index of the material of the concave-convex structure,
wherein the optical surface is formed into a shape having a rotational symmetry axis,
wherein a thickness of the intermediate layer or each of thicknesses of the intermediate layer and the concave-convex structure varies so as to increase as a distance from the rotational symmetry axis increases, and
wherein the optical element satisfies the following condition for ζ(h) that satisfies a condition of $0.3 \leq n \times \sin(\zeta(h)) < 1$:

$$Dc < D(h) < Dc/\cos(\zeta(h))$$

where Dc represents the thickness of the intermediate layer at a position of the rotational symmetry axis, n represents the refractive index of the intermediate layer, D(h) represents the thickness of the intermediate layer at a h-position away from the rotational symmetry axis by a distance h, and a light ray passing through a center of the aperture stop in the optical system and the h-position of the intermediate layer forms an angle ζ(h) in the intermediate layer with a normal to a concave-convex structure-side most superficial surface of the intermediate layer at the h-position.

6. An optical apparatus comprising:
an optical system configured to include an optical element,
wherein the optical element comprising:
a base member configured to have an optical surface;
a concave-convex structure configured to have an average pitch smaller than a shortest wavelength of a use wavelength range; and
an intermediate layer formed between the optical surface and the concave-convex structure, made of a material different from that of the concave-convex structure, and having a refractive index between a refractive index of the base member and a refractive index of the material of the concave-convex structure,
wherein the optical surface is formed into a shape having a rotational symmetry axis, wherein a thickness of the intermediate layer or each of thicknesses of the intermediate layer and the concave-convex structure varies so as to increase as a distance from the rotational symmetry axis increases, and wherein the optical element satisfies the following condition for θ(h) that satisfies a condition of $0.3 \leq n \times \sin(\theta(h)) < 1$:

$$Dc < D(h) < Dc/\cos(\theta(h))$$

where Dc represents the thickness of the intermediate layer at a position of the rotational symmetry axis, n represents the refractive index of the intermediate layer, D(h) represents the thickness of the intermediate layer at a h-position away from the rotational symmetry axis by a distance h, and θ(h) represents an angle that a light ray reaching the intermediate layer at the h-position in parallel with the rotational symmetry axis forms in the intermediate layer with a normal to a concave-convex structure-side most superficial surface of the intermediate layer at the h-position.

7. An optical apparatus comprising:
an optical system configured to include an optical element, wherein the optical element comprising:
a base member configured to have an optical surface;
a concave-convex structure configured to have an average pitch smaller than a shortest wavelength of a use wavelength range; and
an intermediate layer formed between the optical surface and the concave-convex structure, made of a material different from that of the concave-convex structure, and having a refractive index between a refractive index of the base member and a refractive index of the material of the concave-convex structure,
wherein the optical surface is formed into a shape having a rotational symmetry axis,
wherein a thickness of the intermediate layer or each of thicknesses of the intermediate layer and the concave-convex structure varies so as to increase as a distance from the rotational symmetry axis increases, and
wherein the optical element satisfies the following condition for ψ(h) that satisfies a condition of $0.3 \leq n \times \sin(\psi(h)) < 1$:

$$Dc < D(h) < Dc/\cos(\psi(h))$$

where Dc represents the thickness of the intermediate layer at a position of the rotational symmetry axis, n represents the refractive index of the intermediate layer, D(h) represents the thickness of the intermediate layer at a h-position away from the rotational symmetry axis by a distance h, and ψ(h) represents an angle that a light ray having an average incident angle among all light rays passing through the h-position of the intermediate layer in the optical system forms in the intermediate layer with a normal to a concave-convex structure-side most superficial surface of the intermediate layer at the h-position.

8. An optical apparatus comprising:
an optical system configured to include an optical element and an aperture stop,
wherein the optical element comprising:
a base member configured to have an optical surface;
a concave-convex structure configured to have an average pitch smaller than a shortest wavelength of a use wavelength range; and
an intermediate layer formed between the optical surface and the concave-convex structure, made of a material different from that of the concave-convex structure, and having a refractive index between a refractive index of the base member and a refractive index of the material of the concave-convex structure,
wherein the optical surface is formed into a shape having a rotational symmetry axis,
wherein a thickness of the intermediate layer or each of thicknesses of the intermediate layer and the concave-convex structure varies so as to increase as a distance from the rotational symmetry axis increases, and
wherein the optical element satisfies the following condition for ζ(h) that satisfies a condition of $0.3 \leq n \times \sin(\zeta(h)) < 1$:

$$Dc < D(h) < Dc/\cos(\zeta(h))$$

where Dc represents the thickness of the intermediate layer at a position of the rotational symmetry axis, n represents the refractive index of the intermediate layer, D(h) represents the thickness of the intermediate layer at a h-position away from the rotational symmetry axis by a distance h, and a light ray passing through a center of the aperture stop in the optical system and the h-position of the intermediate layer forms an angle ζ(h) in the intermediate layer with a normal to a concave-convex structure-side most superficial surface of the intermediate layer at the h-position.

* * * * *